March 17, 1953 W. C. BUESCHER 2,631,612
HIGH-PRESSURE VALVE
Filed June 25, 1949
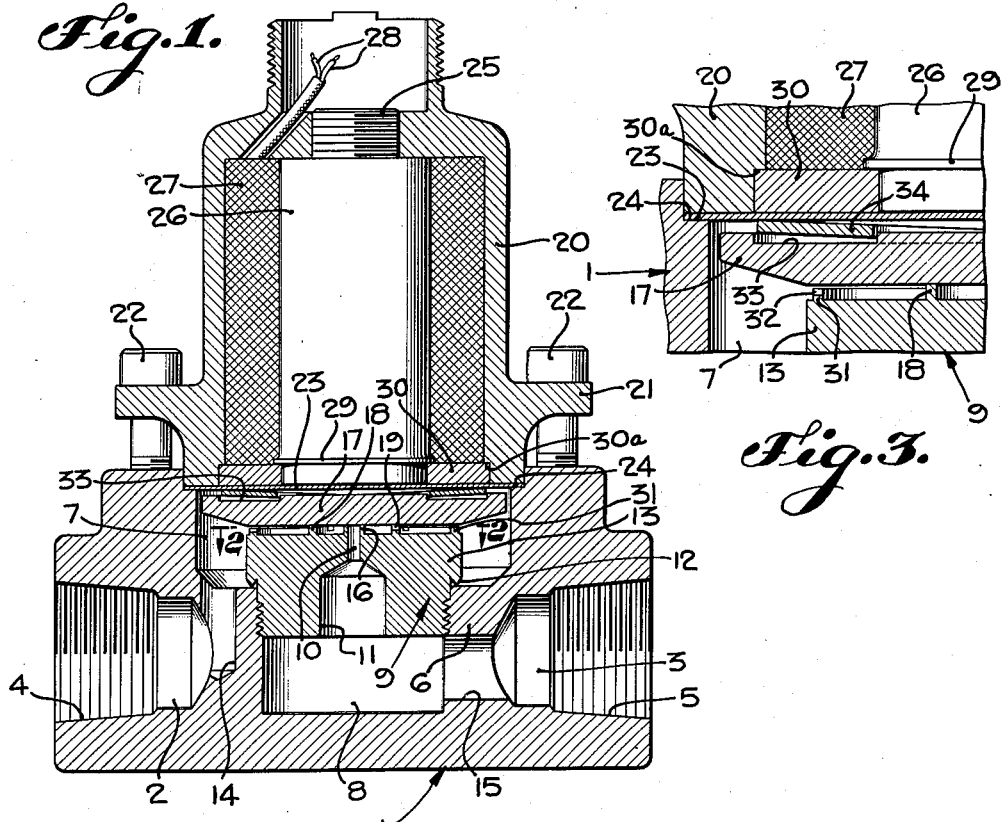
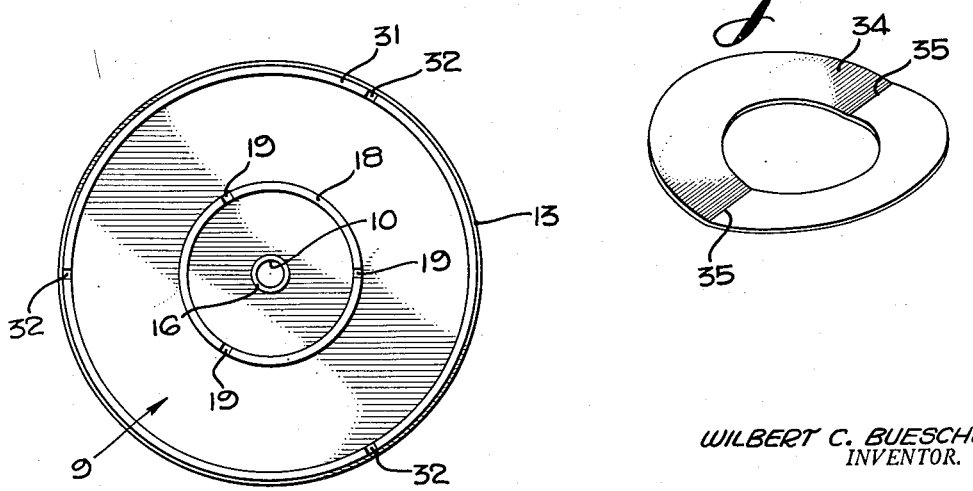
WILBERT C. BUESCHER,
INVENTOR.
BY John Flann
ATTORNEY Patented Mar. 17, 1953

2,631,612

UNITED STATES PATENT OFFICE 2,631,612

HIGH-PRESSURE VALVE

Wilbert C. Buescher, Alhambra, Calif., assignor to General Controls Co., Glendale, Calif., a corporation of California Application June 25, 1949, Serial No. 101,397

3 Claims. (Cl. 137—707)

This invention relates to valves, and particularly to valves for controlling a liquid at high pressures.

Electromagnets are often used to lift an armature that serves as a valve closure. The closure rests upon a valve seat when the electromagnet is deenergized, and the pressure of the liquid is used to urge the seat firmly in place.

Usually, no difficulty is encountered for controlling a liquid in this manner when the pressure of the liquid is not excessive. However, when high pressures are encountered, such as 3000 pounds or more per square inch, the lifting of the armature against the fluid pressure requires a relatively powerful electromagnet; and, upon even a few closing operations, the valve seat is deteriorated, due to the large forces acting upon the armature closure.

It is one of the objects of this invention to make it possible to use an electromagnet that can operate the valve closure without requiring a large force.

It is another object of the invention to make it possible to maintain the valve seat in proper operating condition for long periods even when extremely high liquid pressures are encountered.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a vertical section through a valve structure incorporating the invention;

Fig. 2 is an enlarged view, taken along a plane corresponding to line 2—2 of Fig. 1;

Fig. 3 is an enlarged fragmentary sectional view of a portion of the apparatus;

Fig. 4 is a perspective view of a spring washer for resiliently urging the valve closure against its seat.

A valve body 1 is shown which may appropriately be made of a casting. This valve body 1 may be provided at its left-hand end with an inlet passage 2. A corresponding outlet passage 3 is provided at the right-hand end. Appropriate threaded openings 4 and 5 are indicated, communicating with these passages, for the accommodation of appropriate conduits or pipe.

A partition 6 extends across the valve body 1 to define an inlet chamber 7 and an outlet chamber 8. Communication between the inlet chamber 7 and the outlet chamber 8 is effected through a valve seat forming member 9. This valve seat forming member is threaded into the partition 6. It is provided with a relatively small port 10 which extends between the chambers 7 and 8. Port 10 leads into a larger cylindrical aperture 11. The member 9 has an enlarged head 13 extending above the partition 6. The lower edge of this head has a knife-edge flange 12 sealing against the upper surface of the partition 6 when the member 9 is threaded into the partition 6.

The inlet passage 2 communicates with the chamber 7 by way of a vertical port 14. The outlet passage 3 communicates with the outlet chamber 8 through the horizontal port 15.

A raised narrow seat 16 is provided around the upper end of the port 10. A disc closure member 17 rests upon this seat when the valve is in closed position. The liquid pressure acting on closure member 17 urges this member to closed position. As hereinafter explained, the disc closure member, which is made of magnetic material, is adapted to be raised by an electromagnet against the liquid pressure.

When high fluid pressures of the order of 3000 pounds to the square inch, or higher, are encountered, the force required to lift the closure member 17 from its seat is quite high. By providing a narrow valve seat 16 and a small outlet port 10, the force required to operate the valve closure 17 is maintained at a relatively low value. However, the seat 16 would rapidly deteriorate if no further precautions would be taken.

Accordingly, there is provided an annular land 18 surrounding the seat 16, and also shown as integrally formed with the port forming member 13. This land 18 is ground to be coplanar with the seat 16, so that it is in contact with the lower surface of the closure member 17 when the closure member is in closed position.

The land 18 may be provided with a plurality of slots 19, as indicated in Fig. 2, for equalizing the fluid pressure within the land 18, as well as exterior of the land 18.

The land 18 protects the valve seat 16 from injury, since the closure member 17 is in contact with the land member. Sufficient resilience inheres in the closure member 17 to assure close contact between it and the land 18, as well as with the seat 16.

Operation of the closure member 17 is effected by an electromagnet including a magnetic shell 20. This shell 20 is provided with a flange 21 for the accommodation of the fastening bolts 22 that thread into the upper part of the body 1. The chamber 7 is open at the top, and is closed by a thin non-magnetic diaphragm 23 which overlies the chamber 7 and is urged into sealing contact by the lower edge of the shell 20. The diaphragm 23 thus seals the chamber 7 and is received on a shoulder 24 formed around the upper part of chamber 7.

The upper end of the shell 20 accommodates the threaded extension 25 of a core 26 which has a pole face in contact with the diaphragm 23. In the annular space between the core 26 and the shell 20, an energizing coil 27 is provided having leads 28 extending through the upper end of the shell 20 for appropriate connection to a source of current.

Core 26 has a narrow collar 29 adjacent its lower end serving as an abutment for a non-magnetic ring 30 that is received on a narrow shoulder 30a formed near the bottom of the shell 20. This ring closes the annular space in which coil 27 is accommodated.

The disc armature 17 is thus caused to bridge the air gap between the core 26 and the lower end of the shell 20 when it is in attracted position. In the attracted position, the port 10 is uncovered, and liquid can flow from the inlet chamber 7 to the outlet chamber 8.

The diameter of the disc 17 is appropriately made large enough so that it is guided to some extent by the wall of chamber 7. However, in order to prevent excessive tilting of the armature 17, a supplemental annular land 31 is provided around the land 18. This annular land is also integrally formed on the member 13.

As shown clearly in Fig. 3, this outer land 31 has a small clearance with respect to the lower face of the armature 17. This clearance is exaggerated on the drawing for clarity; it may be of the order of about .0015 inch. It ensures that the armature 17 in its upward movement will be maintained in substantially untilted position.

Furthermore, the land 31 may be provided with a plurality of spaced slots 32.

The upper surface of the armature 17 is provided with an annular recess 33 for the accommodation of a spring washer 34 (Fig. 4). This spring washer 34 is bent upwardly along a transverse line 35 in order to provide the spring action. It urges the armature 17 to closed position when the energizing coil 27 is deenergized.

The width of the seat 16 is shown somewhat exaggerated. In a valve that has an inlet passage 2 of about 1¼ inches in diameter, the seat 16 can have a width of about .015 inch. The port 10 is much smaller than the passage 2, and may be .100 inch in diameter. In this way, only a small amount of differential fluid pressure serves to resist lifting of the armature 17. The external diameter of the port forming member 13 may be about twice that of the inlet and outlet passages 2 and 3.

The lands 18 and 31 may be made quite narrow, but these areas are not critical.

The land 18 effectively protects the deterioration of the seat 16 upon repeated operation of the valve. At the same time, it does not materially increase the differential fluid pressure which must be overcome to lift the closure 17.

The inventor claims:

1. In a valve structure for high fluid pressures: a valve body having a partition dividing the interior of the body into an inlet chamber and an outlet chamber, said body having inlet and outlet passages communicating respectively with the inlet and outlet chambers; said partition having a port therethrough; means forming a raised annular seat around the port; a closure member accommodated on the seat, said closure member extending substantially beyond the seat; said port having a flow area substantially less than the flow area of the inlet passage; means for moving the closure member from the seat; means on the partition forming an annular land around the seat, and in contact with the closure member when the closure member is on the seat; and means on the partition forming a second annular land around the first land, and disposed near the outer edge of the closure member, said closure member when seated having clearance with respect to the said land, there being openings through said lands permitting equalization of pressure independent of the position of said closure.

2. In a valve structure for high fluid pressures: a body having a partition dividing the interior of the body into an inlet chamber and an outlet chamber; said partition having a port for permitting restricted flow of fluid when said port is in communication with said inlet chamber; means forming a narrow annular raised seat in the inlet chamber and surrounding the port; a closure having a surface adapted to seal against said seat, said closure extending substantially beyond said seat; means for lifting the closure from the seat; first land means substantially annularly arranged about said seat, said first land means being in contact with said closure when said closure is on said seat; and second land means substantially annularly arranged about said first land means and having a clearance with respect to the closure when said closure is seated; there being openings through said first and second land means permitting equalization of pressure from said inlet chamber to the interior of said land means independently of the seating of said closure.

3. In a valve structure for high fluid pressures: a valve body having a partition dividing the interior of the body into an inlet chamber and an outlet chamber, said body having inlet and outlet passages communicating respectively with the inlet and outlet chambers; said partition having a port therethrough; means forming a raised annular seat around the port; said seat being narrow with respect to said port; a closure member accommodated on the seat, said closure member extending substantially beyond the seat; said port having a flow area substantially less than the flow area of the inlet passage to form a greatly reduced passageway of orifice proportions with respect to said inlet chamber and said inlet passageway; means for moving the closure member from the seat, said means being capable of exerting only a small force on said closure member; auxiliary means supporting said closure when said closure is in seating relation with said seat, comprising a first annular land surrounding said seat and in contact with the closure member when the closure member is on the seat; and means for preventing tilting of said closure member, comprising a second annular land surrounding said first annular land, and disposed adjacent the outer edge of the closure member, said closure member, when seated, having a small clearance with respect to the second land; said first and second lands having openings for substantially equalizing the fluid pressure force exerted on said closure member whereby said closure moving means can operate said closure.

WILBERT C. BUESCHER.

REFERENCES CITED

The following references are of record in the file of this patent:

UNITED STATES PATENTS

| Number | Name | Date |
|---|---|---|
| 2,005,954 | Petersen et al. | June 25, 1935 |
| 2,294,421 | Ray | Sept. 1, 1942 |
| 2,321,853 | Ray | June 15, 1943 |
| 2,370,752 | Ray | Mar. 6, 1945 |
| 2,372,853 | Ray | Apr. 3, 1945 |

FOREIGN PATENTS

| Number | Country | Date |
|---|---|---|
| 616,502 | Germany | July 30, 1935 |